United States Patent [19]

Rose et al.

[11] Patent Number: 4,790,505
[45] Date of Patent: Dec. 13, 1988

[54] ELECTRICAL BOX SUPPORT BRACKET

[76] Inventors: Steven A. Rose, 11730 W. Washington Blvd. #10, Los Angeles, Calif. 90066; Irving Birken, 809 S. Bundy Dr., W. Los Angeles, Calif. 90049

[21] Appl. No.: 173,735

[22] Filed: Mar. 28, 1988

[51] Int. Cl.⁴ .............................................. A47F 5/00
[52] U.S. Cl. ................................. 248/205.1; 248/121; 248/174; 248/300; 248/DIG. 6
[58] Field of Search .................. 248/205.1, 174, 218.1, 248/219.3, 297.2, 225.31, 228, DIG. 6, 121, 219.1, 219.2, 300

[56] References Cited

U.S. PATENT DOCUMENTS

| | | | |
|---|---|---|---|
| 1,609,446 | 12/1926 | Tormey | 248/228 |
| 2,445,606 | 7/1948 | Davis | 248/300 X |
| 3,606,223 | 9/1971 | Havener | 248/205.1 |
| 3,921,253 | 11/1975 | Nelson | 248/300 X |
| 3,977,640 | 8/1976 | Arnold et al. | 248/205.1 X |
| 4,576,502 | 3/1986 | Smolik | 248/DIG. 6 X |

Primary Examiner—Ramon O. Ramirez
Attorney, Agent, or Firm—Philip D. Junkins

[57] ABSTRACT

A sheet metal channel-shaped bracket for supporting an electrical box at a pre-selected height in the wall-framing space between metallic channel-type wall studs affixed to and extending vertically upward from a metallic U-shaped base channel affixed to the floor of a building structure. The bracket has an elongataed channel-shaped member including a main wall and like side walls with the main wall presenting a front surface for mounting an electrical box thereon. The main wall of the bracket includes an extended sections which is folded into a series of portions which form a foot member for the bracket. The foot member of the bracket has a heel edge designed to engage the rear side wall of the base channel when the bracket is positioned within the base channel and the foot member has a toe bend at the front end of the foot member which forms a clamp for engaging the upper lip portion of the front side wall of the base channel for maintaining the bracket, and an electrical box affixed thereto, in a fixed vertical upright position.

5 Claims, 1 Drawing Sheet

ELECTRICAL BOX SUPPORT BRACKET

BACKGROUND OF THE INVENTION

The present invention relates to support brackets for electrical boxes of the type mounted on or between vertical wall studs utilized in building construction. More particularly, the invention relates to metallic support brackets for multiple outlet metallic electrical boxes of the type mounted on or between metallic channel-type vertical wall-framing studs.

In the construction of a substantial majority of modern day multiple dwelling apartment buildings and condominiums, office buildings, and other commercial buildings having a multiplicity of internal space-dividing walls, pre-formed and pre-cut metallic base channels (affixed to floor structures) and metallic wall studs are utilized to provide strong support for wallboard or "Sheetrock" plasterboard and to speed up internal wall construction. Commonly, wall and door placement is laid out on a building floor and metal base channels are rapidly affixed by nails, screws, rivets or the like to the flooring (wood, concrete, etc.). For the most part, metal base channel pieces are provided in standard 2½ inch widths with a channel depth of 1¼ inch. The metal channel-type studs (usually of common pre-cut length) are appropriately placed (in vertical orientation) at base channel ends to form doorjambs and at 16 inch or 24 inch standard intervals (center-to-center) to act as the studs to which wallboard is affixed on one or both sides of the studs.

With wall construction of the foregoing type the placement of electrical boxes for multiple electric wall outlets is usually accomplished by mounting such boxes (at an appropriate height) on the channel-type studs. In most situations the box is mounted at a box-center height of 12 inches or 16 inches above the floor surface by drilling pilot holes in the stud (matching screw hole spacing on the side wall of the electrical box) and affixing the box to the stud via self tapping screws driven into place by a screw gun. Alternatively, a metal offset bracket of appropriate length is placed in horizontal orientation between adjacent studs (at a desired height) and affixed thereto by self tapping screws. The principal span of such brackets between studs is set back so that standard electrical boxes of either 1½ inch depth or 2⅛ inch depth (when mounted) are appropriately aligned with the plane formed by the faces of adjacent studs. After affixing an offset bracket to the studs, one or more electrical boxes are mounted to such bracket by applying self tapping screws through holes in the back wall of the box and into pilot holes drilled through the bracket.

Both the system of mounting electrical boxes directly to metal studs and the system of mounting electrical boxes to horizontally disposed brackets extending between studs have deficiencies which frequently result in misalignment of electrical boxes and their face plates mounted to such boxes on the room side of plasterboard affixed to the wall studs. Thus, it often occurs that the metallic wall studs are not placed in true vertical orientation. Also, exact horizontal placement of electrical box mounting brackets is difficult without the use of a carpenter's level. Further, the drilling of a number of mounting holes in the metallic studs for each electrical box and for each mounting bracket is time consuming and the proper height spacing and inter-stud placement of such boxes along wall areas requires tedious measurements.

It is an object of the present invention to provide an electrical box support bracket which is easy to install at any point between metallic wall studs and results in properly aligned orientation of the supported electrical box and its face plate, when installed.

It is a further object of the invention to provide an electrical box support bracket which is mountable in the metallic base channel associated with metallic channel-type studs, between such studs, with the result that true vertical alignment of its associated electrical box is easily attained.

It is a still further object of the invention to provide an electrical box support bracket to which an electrical box may be easily pre-affixed at a choice of standard heights with the bracket and attached electrical box thereafter installed in a metallic base channel for true vertical alignment of the box between adjacent metallic channel-type wall studs.

These and other objects and advantages of the invention will become apparent from the following summary and detailed descriptions of the invention taken in conjunction with the accompanying drawing figures.

SUMMARY OF THIS INVENTION

The present invention relates to an electrical box support bracket which may be easily installed (with an affixed electric box) adjacent to or between metallic channel-type wall construction studs. The support bracket is of a length such that the to-be-affixed electrical box may be mounted on the bracket via pre-drilled screw holes (for self tapping screws). Preferably the box is mounted at either of two standard heights (12 inches or 16 inches) measured from the midpoint of such box from the floor. In its preferred form, the support bracket is comprised of a sheet metal channel member which has an integral foot portion adapted for press figment into a metallic base channel of the type used for spaced alignment of channel-type metal wall studs and for affixation of such studs at their lower end. The foot portion of the bracket has a sheet metal heel bend which abuts the rear side wall of the base channel and has a front toe bend which terminates in a clamp fold which engages the upper lip portion of the front side wall of the base channel.

The support bracket has a channel depth such that with an electrical box mounted thereon the combined measurement of bracket and box equals the outside width measurement of the base channel into which the foot portion of the support bracket is inserted. The front clamp fold of the foot portion, through its clamping engagement with the front upper lip portion of the base channel, maintains the support bracket in its upright position at the desired location between adjacent wall studs until the bracket and supported electrical box are enclosed by plasterboard affixed to the wall studs. Through use of the support bracket of the invention, electrical boxes may be easily installed at uniform predetermined heights at any point between metallic channel-type wall studs with true vertical alignment of the box and its face plate assured.

BRIEF DESCRIPTION OF THE DRAWING FIGURES

The invention is illustrated in the accompanying drawing figures in which.

DETAILED DESCRIPTION OF THE INVENTION

Figure 1:
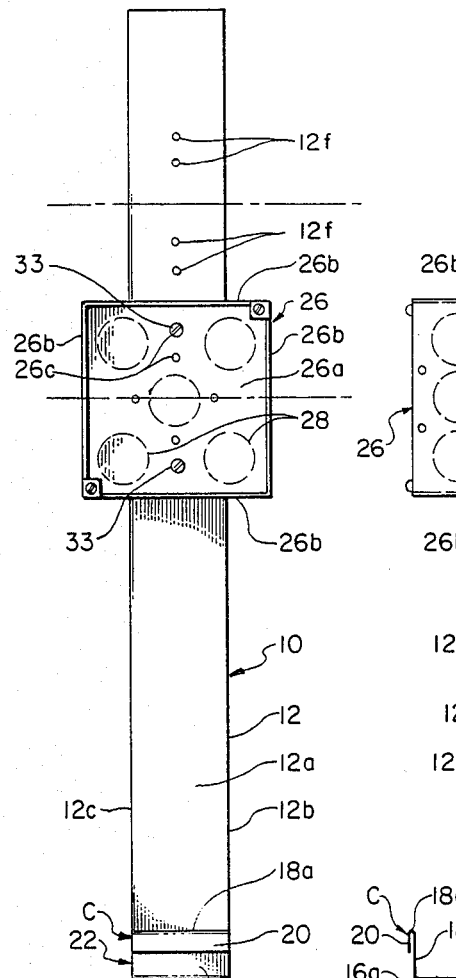
FIG. 1 is a front view of the electrical box support bracket of the present invention.

A preferred embodiment of the electrical box support bracket of the invention is shown in FIGS. 1–4 of the drawing sheet. The support bracket 10 is comprised principally of an elongated sheet metal channel portion 12 having a main channel wall 12a and like side walls 12b and 12c. The lower ends of channel side walls 12b and 12c terminate, respectively, in diagonal edges 12d and 12e.

The main channel wall 12a of the support bracket 10 extends beyond the lower end of channel portion 12 in a series of connected folded sections 14, 16, 18 and 20 which form a foot portion 22 for vertical support of the channel portion 12 of the bracket. Metal fold section 14 extends rearwardly at a right angle from main channel wall 12a for a distance equal to the depth of channel portion 12 to a 360° bend forming a heel edge 14a of foot portion 22. From heel edge 14a metal fold section 16 extends forwardly to a 90° bend forming a toe edge 16a of foot portion 22. Fold section 16 extends for a distance equal to the inner width of the base channel 24 (see base channel 24 illustrated in FIGS. 3 and 4) into which the foot portion 22 of support bracket 10 is to be placed. To add structural integrity to the foot portion 22 of the support bracket 10 several spot welds 14b may be placed across fold section 14 and into fold section 16 to unite such sections. From the edge 16a metal fold section 18 extends upwardly to a 360% toe bend 18a and thence downwardly in fold section 20 forming a base channel clamp C. The base channel 24 is comprised of bottom wall 24a and like side walls 24b and 24c (see FIGS. 3 and 4). The upper or lip portion of base channel 24 side wall 24b is shown to be clamped by clamp C of the foot portion of electrical box support bracket 10. Although not illustrated in FIG. 3, fold sections 18 and 20 of foot portion 22 of vertical support 10 may include one or more metal indent spurs which, upon placement of such foot portion within base channel 24, lock clamp C in its clamping position with respect to the upper lip of side wall 24b of such channel.

Figure 2:
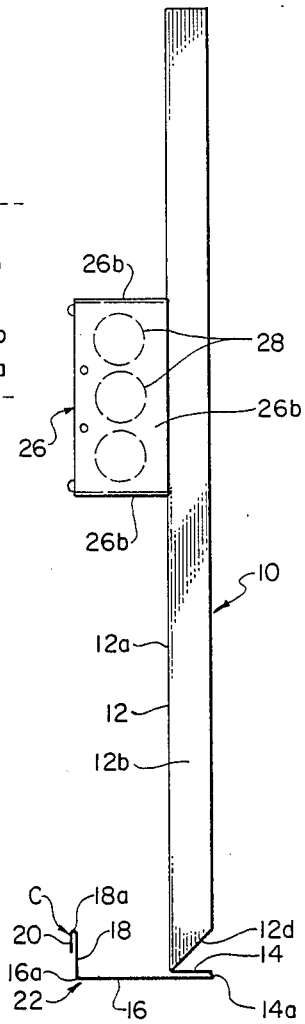
FIG. 2 is a side view of the bracket structure of FIG. 1.
Figure 3:
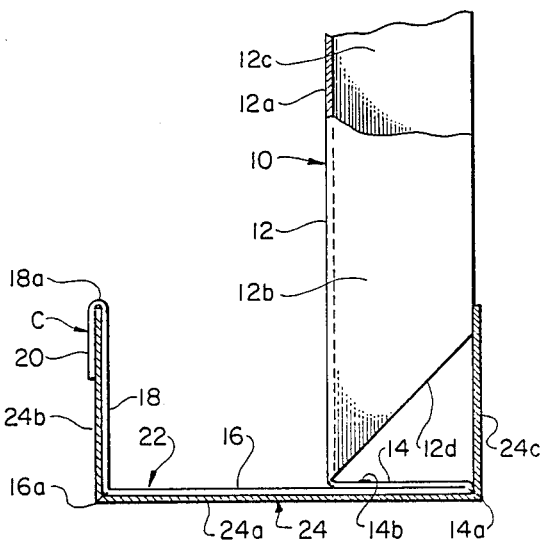
FIG. 3 is an enlarged partial side view of the bottom portion of the electrical box support bracket of FIGS. 1 and 2 in place within a base channel.
Figure 4:
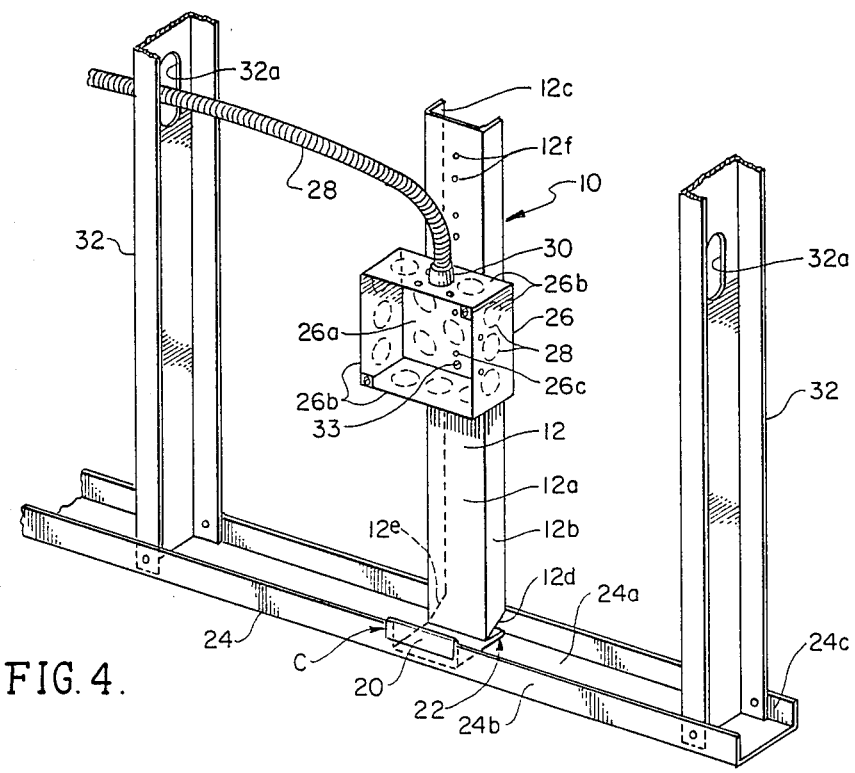
FIG 4 is a perspective view of the electrical box support bracket of the invention in place within a base channel between adjacent vertical channel-type, wall-forming studs.

As illustrated in FIGS. 1, 2 and 4, an electrical box 26 is mounted to the channel portion 12 of support bracket 10. The metallic box 26, of standard design, has a multiplicity of punchout discs 28 on its back wall 26a and on its side and top walls 26b. Such discs when punched out provide entry and exit ports (as required) for electrical wire carrying conduits. As shown in FIG. 4, electrical conduit wiring 28 is connected to electrical box 26 through a conduit or "Romex" connector 30. Mounting of electrical box 26 to support bracket 10 is accomplished by self tapping screws 33 applied through box mounting holes 26c and into pre-drilled pilot holes 12f aligned as shown in FIGS. 1 and 4. In the case of most plasterboard wall construction utilizing metallic channel-type wall studs, it is desired to locate electrical boxes (and their outer wall plates) at a 12 inch or 16 inch, and sometimes 18 inch, center above floor level. Thus, the sets of pre-drilled pilot holes 12f the support bracket 10 should be arranged so that the electrical box 26 can be readily affixed to the bracket so that upon placement of the foot portion of the bracket in a base channel, the box is positioned at the desired height above the floor.

In the FIG. 4 perspective view of the electrical box support bracket of the invention, the bracket 10 is shown in place in connection with base channel 24 between adjacent vertically oriented channel-type wall studs 32 which are appropriately affixed at their lower ends within channel 24. As shown, the studs 32 are provided with conduit ports 32a so that electrical wire conduits, such as conduits 28, may be led within the wall structure to and from various electrical boxes.

In the specification and drawing figures there has been set forth and illustrated a preferred embodiment of the electrical box support bracket in accordance with the invention. Although specific terms have been employed in describing the invention, they are used in a generic and descriptive sense only and not for purposes of limitation, the scope of the invention being defined in the following claims.

What is claimed is:

1. A bracket for supporting an electrical box at a pre-selected height in the wall-framing space between metallic channel-type wall studs affixed to and extending vertically upward from a metallic U-shaped base channel, said bracket, comprising:
   (a) an elongated sheet metal channel member having a main wall and like side walls, said main wall presenting a front surface for the mounting thereon of an electrical box; and
   (b) a foot member for said elongated channel member formed from an extended section of the main wall of said channel member first folded rearwardly at a right angle from said main wall for a distance equal to the depth of said channel member, thence folded forwardly in a 360° tight bend forming a heel edge of said foot member and extending forwardly for a distance equal to the inner width of the base channel into which said foot member is to be placed, thence folded upwardly in a right angle bend for a distance equal to the inner height of the front side wall of said base channel, and finally folded downwardly in a 360° toe bend with an inner diameter equal to the thickness of the front side wall of said base channel and for a distance less than the outer height of said front side wall to form a front clamp portion of said foot member for clamping engagement of the upper lip portion of said front side wall to maintain said bracket in said base channel in a fixed vertical upright position.

2. A bracket for supporting an electrical box at a pre-selected height in the wall-framing space between metallic channel-type wall studs affixed to and extending vertically upward from a metallic U-shaped base channel as claimed in claim 1 wherein the depth of the elongated sheet metal channel member of said bracket is equal to the difference between the inner width of the base channel to which said bracket is fixed in vertical upright position and the depth of an electrical box to be affixed to said channel member.

3. A bracket for supporting an electrical box at a pre-selected height in the wall-framing space between metallic channel-type wall studs affixed to and extending vertically upward from a metallic U-shaped base channel as claimed in claim 1 wherein the main wall of the elongated sheet metal channel member of said bracket is provided with a series of pre-drilled pilot holes for self tapping screws arranged so that an electrical box with box mounting holes can be readily affixed to said bracket at a selected height above the foot member of said bracket.

4. A bracket for supporting an electrical box at a pre-selected height in the wall-framing space between metallic channel-type wall studs affixed to and extending vertically upward from a metallic U-shaped base channel as claimed in claim 1 wherein the lower ends of the like side walls of the elongated sheet metal channel member of said bracket terminate in diagonal edges sloping upwardly and rearwardly from the point at which the extended section of the main wall of said channel member is folded rearwardly from said main wall.

5. A bracket for supporting an electrical box at a pre-selected height in the wall-framing space between metallic channel-type wall studs affixed to and extending vertically upward from a metallic U-shaped base channel as claimed in claim 1 wherein the portion of the extended section of the main wall of the elongated sheet metal channel member of said bracket that is first folded rearwardly from said main wall and the portion of the extended section of said main wall that is thence folded forwardly in a 360° tight bend, forming the heel edge of the foot member, are spot welded together.

* * * * *